United States Patent
Wei

Patent Number: 6,139,715
Date of Patent: Oct. 31, 2000

[54] ELECTROCHEMICAL DEBURRING OR RADIUSING

[75] Inventor: Bin Wei, Clifton Park, N.Y.

[73] Assignee: General Electric Company, Schenectady, N.Y.

[21] Appl. No.: 09/184,686

[22] Filed: Nov. 2, 1998

[51] Int. Cl.$^7$ .............................. B23H 3/00; B23H 9/02
[52] U.S. Cl. ........................ 205/652; 205/659; 205/685; 204/224 M
[58] Field of Search .................................. 205/652, 659, 205/685; 204/224 M

[56] References Cited

U.S. PATENT DOCUMENTS

| | | | |
|---|---|---|---|
| 4,153,524 | 5/1979 | Roche et al. | 205/685 X |
| 5,242,556 | 9/1993 | Masuzawa | 205/685 X |
| 5,833,835 | 11/1998 | Gimaev et al. | 205/685 X |

OTHER PUBLICATIONS

M. Datta et al., "Electromachining Under Pulse Current Condition", Electrochimica Acta, vol. 26, No. 7, 1981, pp. 889–901, (No Month).

B. Wei et al., "Pulse ECM of Titanium Alloy Ti–6A1–4V", Transactions of NAMRI/SME, XXII, North American Manufacturing Research Institutes of the Society of Manufacutirng Engineers, 1994, p. 141, (No Month).

C. Zhou et al., "Electrochemical Machining of Hard Passive Alloys With Pulse Reverse Current", NAMRI/SME, XXV, 1997, p. 147, (No Month).

C. Yu et al., "The Relation Between Copying Accuracy and Electrolytes of ECM for Titanium Alloy", Annals of the CIRP, vol. 30, Jan. 1981, p. 123.

*Primary Examiner*—Donald R. Valentine
*Attorney, Agent, or Firm*—Patrick K. Patnode; Marvin Snyder

[57] ABSTRACT

A method and apparatus for deburring or radiusing articles made of TZM alloys by electrochemical machining uses a pulsating current and a binary salt electrolyte solution simultaneously applied across a gap between a tool electrode and a TZM workpiece. The pulse duration is typically in the range between about 0.5 milliseconds to about 100 milliseconds and the pulse interval is between 5 milliseconds and 150 milliseconds. The pulse voltage amplitude is typically in the range between about 8 volts to about 30 volts. The binary salt electrolyte solution is an aqueous salt solution with a total concentration typically in the range between about 14% to about 20% by weight of sodium chloride and sodium nitrate. The ratio of sodium chloride to sodium nitrate is typically in the range of between about 1:1 to about 1.5:1. The standoff distance, or gap, between the tool electrode and the TZM workpiece is typically in the range between 0.015 mm to about 3.0 mm.

14 Claims, 1 Drawing Sheet

ELECTROCHEMICAL DEBURRING OR RADIUSING

BACKGROUND OF THE INVENTION

This invention relates generally to deburring or radiusing, and more specifically to deburring or radiusing articles made of TZM.

Molybdenum is often used as a base material for high-temperature alloys. A growing demand for a further improvement in high temperature properties of molybdenum was the basis for the increasingly widespread use of TZM. TZM is a molybdenum-based alloy that contains small additions of finely dispersed particles, for example, about 0.5% titanium, about 0.08% zirconium, and between about 0.01% to about 0.04% carbon. The addition of these particles serves to inhibit the grain growth of molybdenum at high temperatures, thus increasing the high-temperature strength of molybdenum. TZM is widely used as, for example, a vacuum furnace hot-zone material, a hot die and mold material, x-ray tube target and cathode cup material, or material for parts in numerous aerospace products.

Electrochemical machining of articles or workpieces typically takes place in an electrolyte solution having a high ionic strength. In this method, the workpiece to be machined serves as the anode and the tool electrode of the electrochemical machining apparatus serves as the cathode. During electrochemical machining, an electric current, by means of a power supply, runs between the anode and the cathode. The electrolyte, usually a simple salt solution, is delivered to the gap in between the anode and the cathode. This combination creates an electrolytic cell in which an electrochemical process will cause controlled erosion of the workpiece. The tool electrode acts as a shaping tool and the workpiece, which workpiece serves as the anode, dissolves locally. The conventional electrochemical machining process, as shown in FIG. 1, employs a continuous current across the gap.

Electrochemical deburring and radiusing are widely applied, cost-effective processes for different alloys. Each alloy, however, requires different process conditions in order to achieve desired results. Therefore, it is necessary to understand the process parameters that will allow for desired results in radiusing or deburring TZM.

Radiusing is the process by which the sharp corners of different alloys are removed and the corner is rounded. Deburring is the process of removing little spikes, or burrs, from the corner edges of an alloy in order to have a smooth surface on the corner.

The conventional electrochemical deburring and radiusing methods, as shown in FIG. 1, use a simple salt electrolyte, such as an aqueous sodium chloride or sodium nitrate solution, and a continuous DC current applied across a gap 14 between a tool electrode 10 and a TZM workpiece 12. This method on TZM, however, produces unsatisfactory surface defects in TZM such as pitting and stray current attacking. Pitting is corrosion on the surface of the TZM workpiece, while stray current attacking is the removal and corrosion of the workpiece on an unfocused area. A continuous DC current creates these problems because the current will dissolve the metal beyond the localized area to be machined. A continuous DC current is not suitable for a precision process such as radiusing or deburring of TZM. Also, a method where a sodium chloride electrolyte solution is used results in poor radiusing results for TZM, while a method employing a sodium nitrate solution results in poor surface quality of the TZM workpiece. Therefore, process modifications are needed to improve the surface quality.

Accordingly, there is a need in the art for an improved method for electrochemically deburring or radiusing TZM articles.

SUMMARY OF THE INVENTION

A method and apparatus for deburring or radiusing articles made of TZM alloys by electrochemical machining uses a pulsating current and a binary salt electrolyte solution simultaneously applied across a gap between a tool electrode and a TZM workpiece. The pulse duration is typically in the range between about 0.5 milliseconds to about 100 milliseconds and the pulse interval is between 5 milliseconds and 150 milliseconds. The pulse voltage amplitude is typically in the range between about 8 volts to about 30 volts. The binary salt electrolyte solution is an aqueous salt solution with a total concentration typically in the range between about 14% to about 20% by weight of sodium chloride and sodium nitrate. The ratio of sodium chloride to sodium nitrate is typically in the range of between about 1:1 to about 1.5:1. The standoff distance, or gap, between the tool electrode and the TZM workpiece is typically in the range between 0.015 mm to about 3.0 mm.

DETAILED DESCRIPTION OF THE INVENTION

Figure 2:
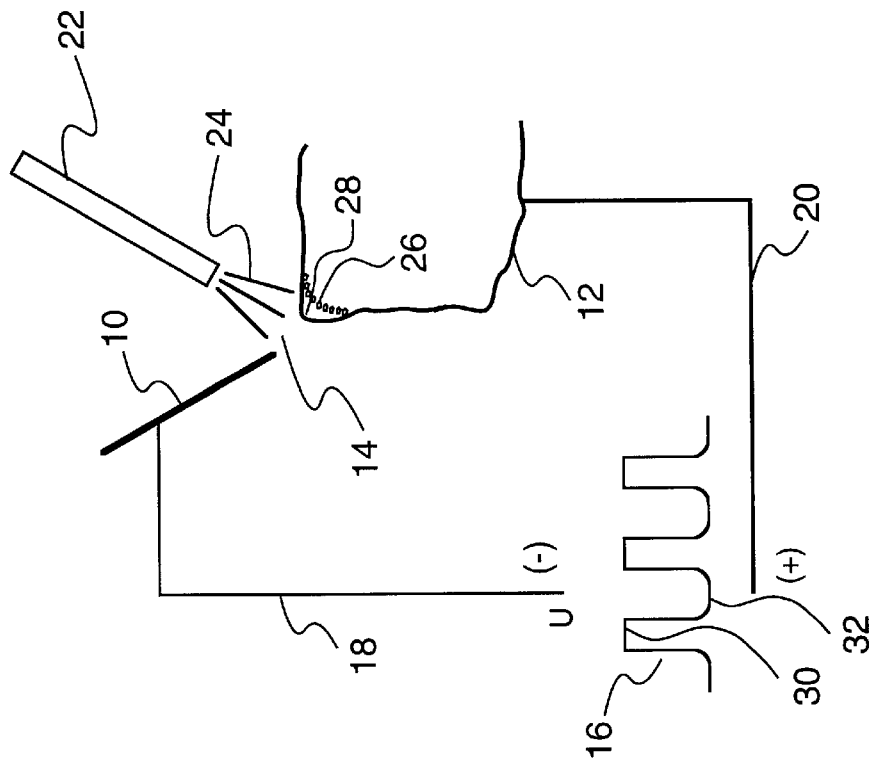
FIG. 2 is a schematic view of a modified electrochemical deburring or radiusing method and apparatus of the present invention.
Figure 1:
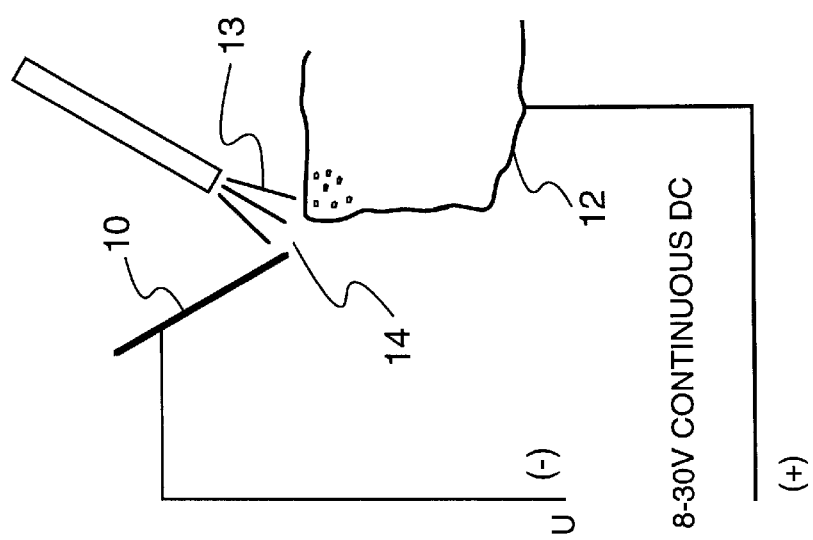
FIG. 1 is a schematic view of a conventional electrochemical deburring or radiusing method and apparatus.

As shown in the schematic view of FIG. 2, a modified electrochemical deburring or radiusing method of the present invention employs a tool electrode 10 adjacent to a TZM workpiece 12. Tool electrode 10 and TZM workpiece 12 are situated so that there is a gap 14 between them. Gap 14 is also referred to as the stand-off distance. A pulse current DC source 16 is connected by a suitable lead 18 to tool electrode 10 and by a suitable lead 20 to TZM workpiece 12. Pulse current DC source 16 and leads 18, 20 are poled so that tool electrode 10 acts as a cathode and TZM workpiece 12 acts as an anode. The connection of pulse current DC source 16 to tool electrode 10 and TZM workpiece 12 impresses a current across gap 14 between tool electrode 10 and TZM workpiece 12.

In addition to being connected to pulse current DC source 16, tool electrode 10 and TZM workpiece 12 are situated in a binary salt electrolyte solution 24, which binary salt electrolyte solution 24 has a high ionic strength. Binary salt electrolyte solution 24 is directed in gap 14 between tool electrode 10 and TZM workpiece 12 by a nozzle 22. Nozzle 22 serves to agitate binary salt electrolyte solution 24 that is flowing through gap 14. This agitation aids in the flow of binary salt electrolyte solution 24 and the efficiency of the electrochemical deburring or radiusing. Binary salt electrolyte solution 24 is supplied to nozzle 22 by means of a filtration pump (not shown), which filtration pump delivers solution 24 to nozzle 22 from a reservoir of binary salt electrolyte (not shown). Alternatively, tool electrode 10 and TZM workpiece 12 may not be situated in binary salt electrolyte solution 24 and binary salt electrolyte solution 24 is directed into gap 14 only, by means of nozzle 22.

Binary salt electrolyte solution 24, in which tool electrode 10 and TZM workpiece 12 are situated, flows through gap 14 at a relatively low pressure, typically in the range between about 10 psi to about 40 psi. Electrolyte pressure will not affect edge quality or surface quality as long as the pulse duration is short and pulse interval of the impressed pulsating current is relatively long.

Binary salt electrolyte solution 24 is a compound electrolyte solution consisting primarily of sodium chloride and sodium nitrate in an aqueous solution. The total concentration of binary salt in the compound is in the range of about 14% to about 20% by weight of the binary salt solution 24. It is preferred to stay within this range for radiusing or deburring TZM in order to achieve good edge quality and good surface quality. If the concentration of binary salt electrolyte solution 24 goes above or falls below this range, surface quality and edge quality of TZM workpiece 12 will be compromised.

The ratio of sodium chloride to sodium nitrate in the binary salt electrolyte solution 24 has also been shown to effect the surface quality of TZM. It is preferred to maintain a ratio of sodium chloride to sodium nitrate in a range between about 1:1 to about 1.5:1. If too much sodium chloride is used, this will typically result in a weaker radiusing effect and edge quality will be compromised. Alternatively, if too much sodium nitrate is used, this will typically result in pitting and surface quality will be compromised. Also in order to obtain the desired results, binary salt electrolyte solution 24 is used at a temperature in the range of about 65° F. to about 80° F. As was discussed above, electrolyte pressure has been shown not to affect surface quality if a pulse current is properly used. Therefore, electrolyte pressure should be kept low. This will mean that electrochemical radiusing or deburring of TZM workforce 12 will be a relatively inexpensive process.

It is preferable that pulse current DC source 16 be a standard transistorized pulse power supply. The parameters of the pulse current will affect the results of the method. Short pulse durations 30, or "on time," are typically used in the range between about 0.5 milliseconds to about 100 milliseconds to ensure that binary salt electrolyte solution 24 only works on an edge 28 to be radiused or deburred as is shown in FIG. 2. A pulse interval 32, or "off-time," which pulse interval 32 ranges from about 5 milliseconds to about 150 milliseconds ensures electrolyte renewal over edge 28. The next pulse will begin to work on edge 28 as is desired without going beyond. It is also important, in order to radius or deburr TZM workpiece 12, to set the pulse voltage amplitude so that the pulse voltage ranges between about 8 volts to about 30 volts. The exact parameters for pulse interval 32, pulse duration 30 and pulse voltage amplitude will depend on the desired size of a corner radius 26 needed (dotted line in FIG. 2).

As shown in FIG. 2, tool electrode 10 and TZM workpiece 12 are positioned adjacently so that only edge 28 on the other outer side of desired corner radius 26 is machined. Edge 28 on the other side of corner radius 26 is the area that will be dissolved as a result of the electrochemical radiusing or deburring process of TZM workpiece 12 with the good surface quality, that is no pitting and no stray current attacking. Gap 14, or stand-off distance, between tool electrode 10 and TZM workpiece 12 should be in the range between 0.015 millimeters to about 3.0 millimeters. Gap 14 should be consistent for each corner of TZM workpiece 12 that is to be machined at the same time. This gap 14 range has been shown to obtain adequate corner radius 26 of TZM workpiece 12.

During the electrochemical radiusing or deburring process, binary salt electrolyte solution 24 is directed through gap 14 between tool electrode 10 and TZM workpiece 12. During pulse duration 30, edge 28 of TZM workpiece 12 is eroded by electrochemical action. After binary salt electrolyte solution 24 passes through TZM workpiece 12, binary salt electrolyte solution 24 flows through a filtration pump (not shown) and is then recycled back either up to nozzle 22 or back through to tool electrode 10 to be directed through gap 14. During pulse interval 32, gap 14 is cooled and the surface of TZM workpiece 12 is relaxed so that during next pulse duration 30, binary salt electrolyte solution 24 will only work on edge 28 or focused area as is shown in FIG. 2.

The setting of the pulse parameters on pulse current DC source 16 and the concentration of binary salt electrolyte solution 24 in this electrochemical radiusing or deburring method allows for a good edge quality and limits surface defects for TZM articles.

While only certain features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method for electrochemical deburring or radiusing of a TZM workpiece with a tool electrode, poled to cause said tool electrode to act as a cathode and said TZM workpiece to act as an anode, said method comprising:

directing a binary salt electrolyte solution comprising aqueous sodium chloride and sodium nitrate through a gap between said tool electrode and said TZM workpiece; and applying a pulsating current across said gap.

2. The method as claimed in claim 1 wherein said binary salt electrolyte solution has a compound concentration between about 14% to about 20% by weight of sodium chloride and sodium nitrate in water.

3. The method as claimed in claim 2 wherein said binary salt electrolyte solution has a ratio of sodium chloride to sodium nitrate in a range between 1:1 to about 1.5:1.

4. The method as claimed in claim 3 wherein said binary salt electrolyte solution is employed at an operating temperature in the range between about 65° F. to about 80° F.

5. The method as claimed in claim 1 wherein said binary salt electrolyte solution has a ratio of sodium chloride to sodium nitrate in a range between about 1:1 to about 1.5:1.

6. The method as claimed in claim 1 wherein said pulsating current is supplied from a pulse current DC source.

7. The method as claimed in claim 6 wherein said pulsating current has a pulse duration in a range between about 0.5 milliseconds to about 100 milliseconds.

8. The method as claimed in claim 7 wherein said pulsating current has a pulse interval in a range between about 0.5 milliseconds to about 150 milliseconds.

9. The method as claimed in claim 8 wherein said pulsating current has a pulse voltage amplitude in a range between about 8 volts to about 30 volts.

10. The method as claimed in claim 1 wherein said gap between said tool electrode and said TZM workpiece is in a range of between about 0.015 millimeters to about 3.0 millimeters.

11. Apparatus for electrochemical deburring or radiusing of a TZM workpiece, said apparatus comprising:

a tool electrode to be positioned in a spaced relationship with respect to said TZM workpiece;

means for directing a binary salt electrolyte solution comprising aqueous sodium chloride and sodium nitrate through a gap between said tool electrode and said TZM workpiece, and;

means for applying a pulsating current across said gap.

12. The apparatus as claimed in claim 11 wherein said pulsating current is supplied from a pulse current DC source.

13. The apparatus as claimed in claim 12 wherein said pulsating current has a pulse duration in a range between about 0.5 milliseconds to about 100 milliseconds, said pulsating current has a pulse interval in a range between 5 milliseconds to about 150 milliseconds, and said pulsating current has a pulse voltage amplitude in a range between about 8 volts to about 30 volts.

14. The apparatus as claimed in claim 11 wherein said gap between said tool electrode and said TZM workpiece is in a range between about 0.015 millimeters to about 3.0 millimeters.

* * * * *